(12) United States Patent
Proctor, Jr. et al.

(10) Patent No.: US 7,233,771 B2
(45) Date of Patent: Jun. 19, 2007

(54) NON-FREQUENCY TRANSLATING REPEATER WITH DOWNLINK DETECTION FOR UPLINK AND DOWNLINK SYNCHRONIZATION

(75) Inventors: James A. Proctor, Jr., Melbourne Beach, FL (US); Kenneth M. Galney, Satellite Beach, FL (US)

(73) Assignee: WiDeFi, Inc., Melbourne, FL (US)

( * ) Notice: Subject to any disclaimer, the term of this patent is extended or adjusted under 35 U.S.C. 154(b) by 0 days.

(21) Appl. No.: 11/127,320

(22) Filed: May 12, 2005

(65) Prior Publication Data

US 2005/0254442 A1    Nov. 17, 2005

Related U.S. Application Data

(60) Provisional application No. 60/570,439, filed on May 13, 2004, provisional application No. 60/570,466, filed on May 13, 2004, provisional application No. 60/570,465, filed on May 13, 2004.

(51) Int. Cl.
*H04B 7/15* (2006.01)
*H04B 7/14* (2006.01)
*H04B 7/17* (2006.01)

(52) U.S. Cl. .......................... 455/11.1; 455/7; 375/211; 370/316

(58) Field of Classification Search ............... 455/11.1, 455/7, 8; 375/211, 492, 501; 370/226, 246
See application file for complete search history.

(56) References Cited

U.S. PATENT DOCUMENTS

| 5,509,028 | A  | * | 4/1996  | Marque-Pucheu | 375/211 |
| 6,061,548 | A  | * | 5/2000  | Reudink       | 455/18  |
| 6,088,570 | A  | * | 7/2000  | Komara et al. | 455/11.1 |
| 6,342,777 | B1 | * | 1/2002  | Takahashi     | 370/315 |
| 6,377,612 | B1 | * | 4/2002  | Baker         | 375/141 |
| 6,501,955 | B1 | * | 12/2002 | Durrant et al.| 455/456.1 |
| 6,690,657 | B1 | * | 2/2004  | Lau et al.    | 370/315 |
| 2003/0236069 | A1 | * | 12/2003 | Sakata et al. | 455/11.1 |
| 2004/0229563 | A1 | * | 11/2004 | Fitton et al. | 455/7   |

OTHER PUBLICATIONS

International Search Report in corresponding International application No. PCT/US05/16592 dated Jun. 28, 2006.

* cited by examiner

*Primary Examiner*—Tilahun Gesesse
(74) *Attorney, Agent, or Firm*—Posz Law Group, PLC

(57) ABSTRACT

A non-frequency translating repeater (110, 210, 300) for use in a time division duplex (TDD) radio protocol communications system includes detection retransmission and automatic gain control. Detection is performed by detectors (309, 310) and a processor (313). Detection can be overridden by processor (313) using logic elements (314). Antennae (220, 230) having various form factors can be used to couple a base station (222) to a subscriber terminal (232) which can be located in a sub-optimal location such as deep inside a building or the like.

54 Claims, 7 Drawing Sheets

NON-FREQUENCY TRANSLATING REPEATER WITH DOWNLINK DETECTION FOR UPLINK AND DOWNLINK SYNCHRONIZATION

CROSS REFERENCE TO RELATED APPLICATIONS

This application is related to and claims priority from pending U.S. Provisional Application No. 60/570,439 filed May 13, 2004, pending U.S. Provisional Application No. 60/570,466 filed May 13, 2004, and pending U.S. Provisional Application No. 60/570,465 filed May 13, 2004 and is further related to PCT Application PCT/US03/28558 entitled WIRELESS LOCAL AREA NETWORK WITH REPEATER FOR ENHANCING NETWORK COVERAGE, and PCT Application PCT/US03/35050 entitled WIRELESS LOCAL AREA NETWORK REPEATER WITH DETECTION the contents of which are incorporated herein by reference.

BACKGROUND OF THE INVENTION

The present invention relates generally to wireless networks and, particularly, the present invention relates to dynamic frequency and time slot detection and media access control in a non-frequency translating repeater.

Several emerging protocols and/or specifications for wireless local area networks, commonly referred to as WLANs, or wireless metropolitan area networks known as WMANs, are becoming popular including protocols such as 802.11, 802.16d/e, and related protocols also known by names such as "WiFi" or "WiMAX", time division synchronization code division multiple access (TDS-CDMA), Personal Handyphone Systems (PHS), and the like. Many of these protocols, such as PHS for example, are gaining popularity as a low cost alternative in developing nations for providing network access in a WMAN, or cellular-like infrastructure.

While the specifications of products using the above standard wireless protocols commonly indicate certain data rates and coverage ranges, these performance levels are often challenging to realize. Performance shortcomings between actual and specified performance levels can have many causes including attenuation of the radiation paths of RF signals, which for 802.16d/e is typically associated with a 10 MHz channel in the 2.3 to 2.4 GHz licensed band although 802.16 can support transmission frequencies up to 66 GHz. Of particular interest, due in part to its wide acceptance in the global market place, are systems such as PHS as noted above, which operate using a Time Division Duplex (TDD) protocol.

Problems arise in that structures such as buildings where wireless network support is desired may have floor plans including obstructing wall placements and the like, and may have construction based on materials capable of attenuating RF signals, all of which may prevent adequate coverage. Still further, data rates of devices operating using the above standard wireless protocols depend heavily on signal strength. As distances in the area of coverage increase, wireless system performance typically decreases. Lastly, the structure of the protocols themselves may affect the operational range.

Repeaters are commonly used in the wireless industry to increase the range of wireless systems. However, problems and complications arise in that system receivers and transmitters in any given device may, for example, in a TDD system operate within an allocated time slot. In such systems, when multiple transmitters operate simultaneously, as would be the case in repeater operation, difficulties may arise. Some TDD protocols provide defined receive and transmit periods and, thus, are resistant to collisions.

In a TDD system, receive and transmit channels are separated by time rather than by frequency and further, some TDD systems such as PHS systems and 802.16 systems, use scheduled times for specific uplink/downlink transmissions. Other TDD protocols such as 802.11 do not use scheduled time slots structured. Receivers and transmitters for TDD systems may be isolated by any number of means including physical separation, antenna patterns, frequency translation, or polarization isolation. An example of isolation using frequency translation can be found in International Patent Application No. PCT/US03/28558 entitled "WIRELESS LOCAL AREA NETWORK WITH REPEATER FOR ENHANCING NETWORK COVERAGE", based on U.S. Provisional Application No. 60/414,888. It should be noted however, that in order to ensure robust operation, a non-frequency translating repeater in order to operate effectively must be capable of rapidly detecting the presence of a signal and operating cooperatively with the media access control and overall protocol associated with the TDD system in which it is repeating in order to effectively repeat the transmission on a timeslot.

A PHS system, as will be appreciated by one of ordinary skill in the art, is a TDD system with designated control timeslots for the uplink and the downlink on a designated frequency channel having a bandwidth of 300 KHz and a plurality of traffic time slots each of which may be assigned to another frequency carrier within a 20 MHz bandwidth. For each connection established within a PHS system, the uplink and downlink operate on the same frequency carrier and "channel", however the uplink and downlink occupy different time slots. Of further interest are TDD systems operating under the 802.16 standards and protocols which, as will be appreciated, use a known frequency channel for all time slots.

SUMMARY OF THE INVENTION

Accordingly, in various exemplary and alternative exemplary embodiments, the present invention extends the coverage area in a wireless environment such as a WLAN environment, and, broadly speaking, in any time division duplex system including IEEE 802.16, IEEE 802.20, PHS, and TDS-CDMA, with a dynamic frequency detection method and repeating method which can perform in systems using scheduled uplink and downlink timeslots or unscheduled random access, for example, as used in 802.11 based systems. Further, an exemplary repeater can operate in synchronized TDD systems such as 802.16 and PHS systems where the uplink and downlink repeating direction can be determined by a period of observation or by reception of broadcast system information. An exemplary WLAN non-frequency translating repeater allows two or more WLAN nodes typically having non scheduled transmissions, or synchronous and scheduled units such as a subscriber unit and a base station unit to communicate by synchronizing to a control slot interval or any regular downlink interval on, for example, a narrow band downlink control channel as in a PHS system, and repeat a wider bandwidth set of carrier frequencies to a wideband repeated downlink. In other systems such as in 802.16 systems, the control time slot detection bandwidth will be the same as the repeated bandwidth. On the uplink side, the repeater preferably monitors one or a number of slots for transmission on the subscriber side by performing wideband monitoring, and when an uplink transmission is detected, the received signal can be repeated on the uplink channel toward the base station equipment. In accordance with a various exemplary embodiments, the repeater will preferably provide a direct repeating solution where the received signal is transmitted on essentially the same time slot including any repeater delay.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention

DETAILED DESCRIPTION OF THE INVENTION

Figure 1:
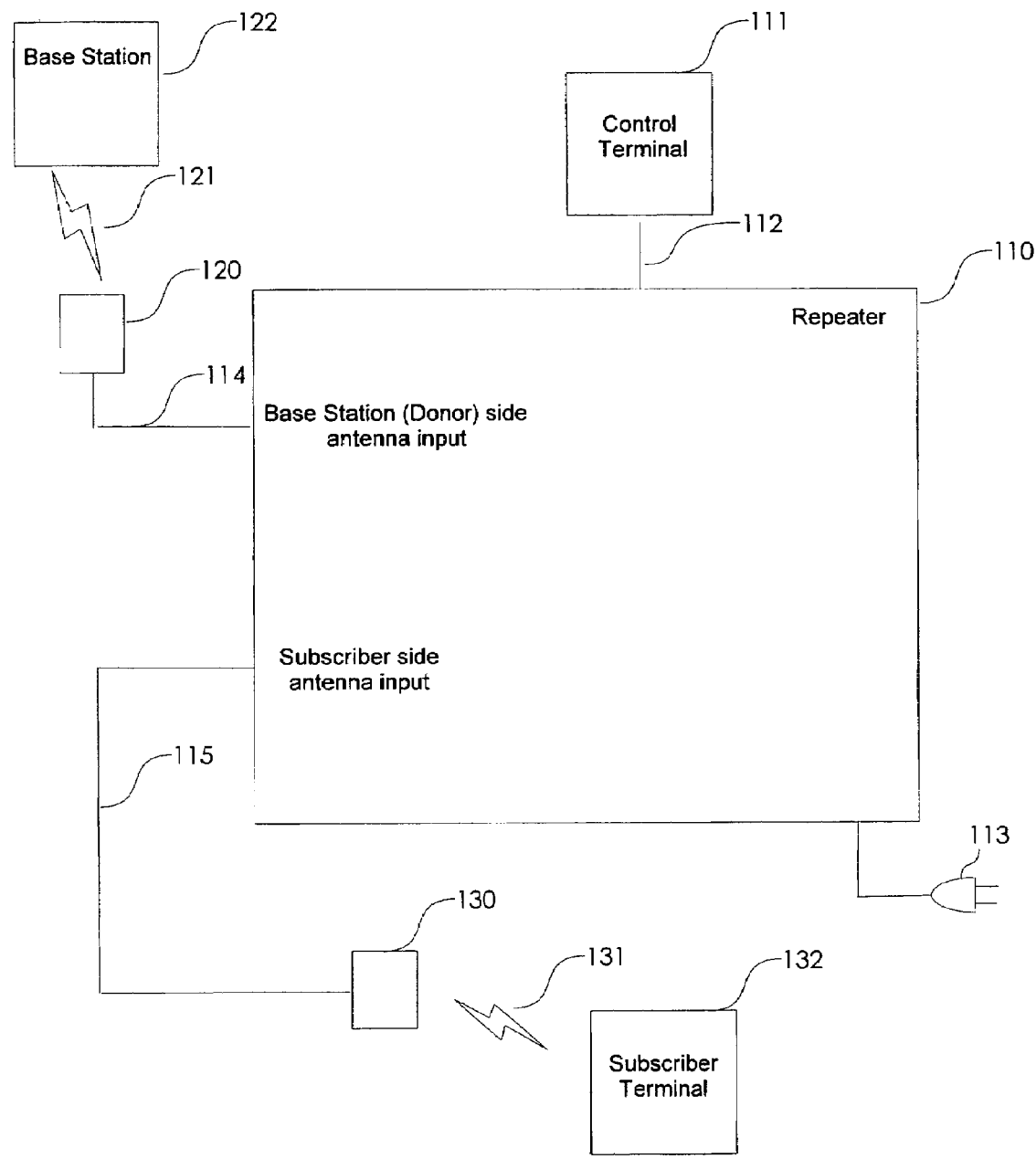
FIG. 1 is a diagram illustrating an exemplary non-frequency translating repeater in accordance with various exemplary embodiments.

Referring now to FIG. 1, an exemplary non-frequency translating repeater 110 is shown. The repeater 110 can include a control terminal 111 connected to the repeater 110 through a communication link such as a link 112 which can be a RS-232 connection or the like for conducting serial communication for various purposes such as to configure the repeater 110, collect various metrics, or the like. It will be appreciated that in a production model of the repeater 110, such a connection will not likely be used since the configuration will be completed during manufacturing or the repeater 110 will be automatically configured under control of, for example, a microprocessor, controller, or the like. The repeater 110 system may also include an external antenna 120 for communicating with one side of a TDD repeater connection such as a base station 122 through a wireless interface 121. It will be appreciated that the base station 122 can refer to any infrastructure node capable of serving multiple subscribers, such as a PHS cell station (CS), or the like. The antenna 120 can be coupled to the repeater 110 through a connection 114 which can be accomplished using a direct coupled connection such as by using a coaxial cable and SMA connector or other direct connection as will be appreciated by one of ordinary skill in the art.

Another antenna 130 can be used to communicate to another side of the TDD repeater connection such as a subscriber terminal 132 through a wireless interface 131. The subscriber terminal 132 will be used herein refer to a device configured to receive service from the base station 122 as a user entity, user equipment, terminal equipment, such as a PHS personal station (PS), or the like. The antenna 130 can be coupled to the repeater 110 through a connection 115 which can be accomplished using a direct coupled connection such as by using a coaxial cable and SMA connector as noted above. The repeater 110 will be powered by a standard external DC power supply.

It will also be appreciated that in some embodiments the antennas 120 and 130 may be directional antennae and may also be integrated into a single package with repeater circuitry associated with the repeater 110 such that, for example, one side of the package can be directed in one direction such as toward a base station and the other side of the package or enclosure can be directed in another direction such as toward a subscriber or the like when mounted in a window or an external wall of a structure. Further, the antennae 120 and 130 may be directed or omni-directional in their radiation pattern. For a personal internet (PI) repeater, it is expected that one antenna will be mounted outside of a building, and the other antenna will be situated inside of the building. The PI repeater may also be situated inside of the building. It will also be appreciated that many different form factors can be used to accomplish the proper placement and configuration. For example, cross-polarized antennae can be used such as cross-polarized patch antennae, planar antennae, strip antennae or the like can be used as will be appreciated by one of ordinary skill in the art. Further, two such antennae can be used, one for input and one for output or the like as will be appreciated. In a typical scenario, one of the antennae 120 and 130, in the present example the antenna 120, can be defined as the "donor" antenna, that is, the antenna coupled to the base station 122.

Figure 2:
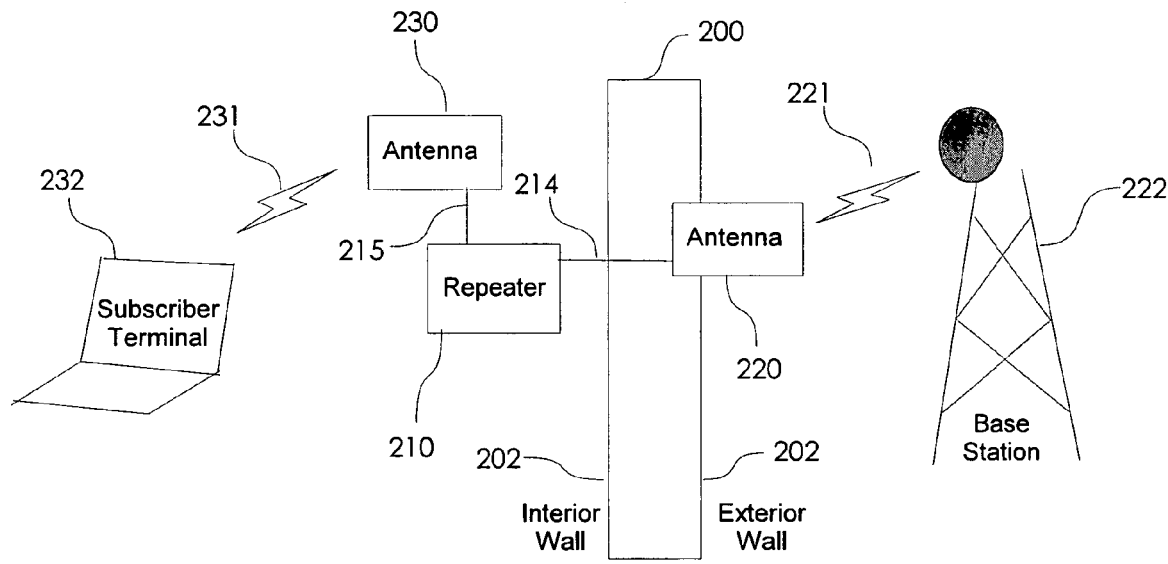
FIG. 2 is a diagram illustrating an exemplary non-frequency translating repeater environment including a subscriber side and a base station side.

To better appreciate the operating environment of an exemplary repeater or repeater system in accordance with various exemplary embodiments, reference is made to FIG. 2. A base station 222 operated, for example, by a service provider of an 802.16, TDS-CDMA, PHS based system or the like, can communicate with a subscriber terminal 232, which may be located, for example, inside a building. A directional antenna 220 can be located on an exterior wall portion 202 of wall 200 such as in a window, on an external surface or the like and can be coupled through link 214 to a non-frequency translating repeater 210. Packets transmitted between the subscriber terminal 232 and the base station 222 can be repeated in a manner to be described in greater detail hereinafter.

It is important to note that in considering aspects of the physical structure of the repeater 210 some underlying assumptions about the system can be made. In the present discussion repeater 210 is assumed to operate in an environment consisting of a single base station and a single subscriber terminal 232 although it will be appreciated that in some embodiments, multiple subscribers and/or base stations can be included. The frame duration, receive/transmit transition gap (R/T-TG) to be described in greater detail hereinafter, and the percentage of time allocated to downlink subframes with respect to the length of the frame are known in advance, and in some embodiments, variable frame duration may be possible to accommodate. In a typical session, the expected frame duration is 5 ms, the R/T-TG gaps are expected to be at least 5 μs in duration. A 50% split is expected between the uplink and downlink subframe portions of the frame. Notwithstanding such assumptions, the repeater 210 will be required to autonomously synchronize with start timing of the frame in a manner to be described hereinafter. Further, for example in accordance with an exemplary 802.16 based embodiment, the 10 MHz operating channel in the 2.3 to 2.4 GHz transmission band will be known by the service provider and can be set manually at the repeater 210 such as using a control terminal or the like.

Further, in accordance with an exemplary PHS based embodiment, a typical base station 222 can support a number of channels, typically 4 channels including a control channel having a bandwidth of 300 KHz. The remaining traffic channels each may be assigned to another frequency carrier within a 20 MHz bandwidth and provide a duplex communication link between the base station 222 and a plurality of subscriber terminals 232. For each connection established within a PHS system, the uplink and downlink operate on the same frequency carrier and paired uplink/downlink time slot "channel", however the uplink and downlink occupy different time slots as will be described in greater detail in connection with FIG. 7.

An LED indicator will be able to visually notify when proper synchronization of the frame timing has been achieved, if required. Further, a series of LED indicators, for example of a different color, can be provided to show relative signal strength to aid in placement of the antenna and/or the repeater. As noted above, a RS-232 connector may be provided for hook-up to a control terminal such as a laptop computer with repeater configuration software driven by a graphical user interface (GUI). The configuration software will be able to configure, for example, the operating channel, the uplink and downlink TDD split, and can graphically observe key parameters of the repeater in operation. Once such parameters are determined, or once a scheme for application of certain values under certain conditions is determined, such operating control can be delegated to a microprocessor or the like with an operating program. The microprocessor/controller with associated software and/or firmware can then be used for parameter control in production repeaters.

It is contemplated that the TDD format of the IEEE 802.16d/e orthogonal frequency division multiple access (OFDMA) (TTA-PI Korea) standard should work very well for the development of an exemplary non-frequency translating repeater for commercial use in global markets. Since the uplink and downlink frames will be synchronized between various base stations of a given system, there is little risk of base station transmissions occurring at the same time as subscriber terminal transmissions serving to mitigate problems such as the near-far effect and the fact that a typical base station 222 may be transmitting with a significantly higher effective isotropic radiated power (EIRP) level than the subscriber terminal 232.

To accomplish TDD repeating, aside from the required signal amplification, the only modification to the radio signal by the repeater 210 is the addition of approximately 1 μs of propagation delay. Since the additional delay of 1 us is constant, symbol synchronization at the subscriber terminal 232 or the base station 222 is not a problem. The subscriber terminal 232 may receive both the signal from the base station 222 and also the repeater 210 with negligible effect. Given that the cyclic prefix time (CP) is 12.8 μs, for an exemplary 802.16 configuration the additional delay is relatively nominal, and the OFDM subcarriers should remain orthogonal when the direct and repeated signal is received.

In accordance with some protocols, such as 802.16, the subscriber terminal 232 may periodically receive an OFDMA Power Control Information Element containing an 8-bit quantized signed value indicating a change in power level in 0.25 dB increments as will be appreciated. Because of the likelihood of power control associated with the subscriber terminal 232, the automatic gain control setting of the repeater 210 needs to be held to as constant a level as possible. Any gain provided to the "input" antenna of the repeater 210 needs to be passed through to the power amplifier in a consistent manner. In order to prevent saturation of the power amplifier, coarse corrections, such as corrections in 10 dB steps, or the like, could be made on a periodic basis to reestablish an acceptable power baseline. Adjustment in this manner should not be a problem so long as the rate of coarse power level adjustment is much lower than the 30 dBs/second power control adjustment rate at the base station 222. The repeater 210 could, for example, adjust the gain in 10 dB increments once per minute without serious disruption to the overall system based power control scheme. It should be noted that the specific implementation of the automatic gain control (AGC) loop can be decided in connection with a particular application or set of requirements for a particular customer or the like. On the downlink, the signal is not power controlled, but rather the subscriber terminal 232 periodically reports the measured RSSI and its variance to the base station 222 quantized in 1 dB increments ranging, for example, from 40 dBm to −123 dBm. It is expected that the received signal strength to be well within this quantization range wherever the repeaters are deployed.

It will be appreciated that with OFDMA, multiple users can be receiving or transmitting simultaneously on different subcarriers. The number of subcarriers allocated to each user and the total number of subcarriers which are being used for user traffic are variable from frame to frame. Accordingly, some variation may occur in received power levels at the antenna input of the repeater 210 as not all subcarriers will be allocated during every frame. However, due to the averaging created by a large number of active users, and the relatively slow operation of the AGC loop in comparison to the duration of a frame, frequency domain multiplexing of users should not be a significant problem for the repeater 210.

As will be appreciated by one of ordinary skill in the art, the repeater 210 may apply a gain of, for example, 60 to 70 dB to the inbound and outbound signals and may operate on the same frequency on both the uplink and downlink time periods in duplex mode. If a portion of the output signal reaches the input either externally or internally with sufficient gain, an input to output oscillation condition, similar to that which can occur in certain types of CDMA repeaters, could occur, significantly reducing system performance. The amount of internal and external isolation correspondingly limits the amount of amplification the repeater 210 can provide. Thus, providing 75 dB of gain requires that antenna to antenna isolation of the repeater 210 and the antenna to antenna isolation of the particular installation be 10 dB above the maximum applied gain or 85 dB of isolation. To achieve the desired internal isolation, careful attention to leakage and EMI related issues must be taken into account in the circuit design particularly in the input signal and feedback path design. To achieve the desired external isolation, it is assumed that, as a minimum, a directional antenna will be used for, for example, the link 221 to the base station 222. It can also be assumed that the antenna 220 serving the link 221 to the base station 222 will be on the exterior wall 202 of wall 200 with as close a line of site connection to the base station 222 as possible. The link 231 from the repeater 210 to the subscriber terminal 232 is assumed to use an omni directional antenna as would typically be installed inside of a building or structure. If signal oscillation continues to occur, the repeater 210 can detect it and reduce the amount of gain to the link 231 until better antenna to antenna isolation is achieved, either by further separating the antennas, or by optimizing there orientation or placement.

For proper TDD operation, for example in the exemplary PHS and the exemplary 802.16 embodiments, the repeater 210 needs to determine whether to amplify the signal in the uplink direction or the downlink direction, by determining the start and end timing of the uplink and downlink subframes associated with the relevant TDD protocol. For example, on the downlink subframe, the signal arriving at the directional antenna 220 facing the base station 222, also referred to as the donor port, needs to be amplified and output at directional antenna 230. On the uplink subframe, the signal from subscriber terminal 232 arriving at directional antenna 230 needs to be amplified in the opposite direction and output at directional antenna 220 to the base station 222.

It should be noted that in accordance with 802.11 TDD repeating, the presence of a packet on one of the two antennas is detected and the direction of amplification is dynamically changed. Other techniques for TDD amplification such as TDD remote amplifiers can clip the beginning of a packet due to the amplifier being disabled prior to detection of the presence of the wave form. If the preamble of the waveform is not clipped, 802.11 TDD repeaters may be cascaded in series for deeper in-building penetration. While cascading and associated detection techniques work well for 802.11 systems, some form of uplink/downlink synchronization must be employed where multiple subscribers may be transmitting. Multiple subscribers may confuse the repeater 210 if more system information is not used.

In accordance with various exemplary embodiments, several methods can be used to determine TDD framing. Thus the repeater 210 can use a number of strategies to accurately determine the direction in which the signal amplification should take place. The techniques described herein are not affected by timing differences due to factors such as the propagation distance from the repeater 210, and unwanted signals arriving from adjacent cell sites which may arrive after the end of the subframe in which they were transmitted.

The methods for determining amplification direction can involve a combination of metrics such as using first signal arrival to gate and latch the repeater 210. It should be noted that since, through normal system operation in accordance with various protocols, the base station 222 will decide to advance or retard transmission from different subscribers so that packet transmissions arrive at the same time, the repeater 210 can be configured to latch on the first arriving signal and ignore any other channel detection for that packet.

It will be appreciated that statistical analysis of received power levels as a function of time can also be used to determine amplification direction. It is expected that during the downlink subframe, the received power into the directional antenna 220 facing the base station 222 will have distinct properties. Known transmission features associated with the signal from the base station 219 may further be used for, or to assist in synchronization.

Additional features associated with timing can include defined gaps and control channel slot consistently appearing on the downlink on a periodic basis. Thus, the consistency and periodicity can be used with known system information such as uplink and downlink slot parameters to identify and synchronize with the timing of the base station.

Feature detection, as described above, can include detailed statistical analysis of the signal from the base station 222 to identify known features and timing characteristics of the signal. Accordingly, three exemplary steps can employed by the repeater 210 for determining the direction of amplification of the wireless signal. First, the location of the transmit/receive transition gaps (T/R-TG) as will be described hereinafter can be determined in part by monitoring the directional antenna 220 during initialization. Second, the start timing and the duration of the downlink subframe within the 5 ms IEEE 802.16 frame can be determined. Lastly, the transmit and receive timings between the uplink and the downlink subframes can be adjusted at a rate of once per frame. For an exemplary PHS embodiment, the known frequency channel and period of the control channel of the CS among the repeated channels can be used.

In a further technique for determination of amplification direction, modem based synchronization can be used. An IEEE 802.16, PHS, or other modem could be used to explicitly receive signaling information about the timing of the uplink and downlink subframes and apply such information in synchronization.

In accordance with one exemplary embodiment, the repeater 210 looks and functions in a manner similar to cdma2000 RF based repeaters but with specific differences as will be described and appreciated by those of ordinary skill. A typical repeater system as described above, consists of an outdoor directional antenna with a gain of perhaps 10 dBi with a coaxial cable several feet in length connected to an indoor repeater module. The repeater module will be powered by an external DC power supply. The repeater will also be connected to an indoor omni directional antenna with a gain of perhaps 5 dBi amplifying the signal to the various rooms of a subscriber residence, work space or the like. The indoor antenna may also be directional as long as the proper antenna to antenna isolation is achieved.

It will be appreciated that a technical support person may be necessary to mount the directional antenna 220 to the exterior wall portion 202 of the wall 200 of the building and to run the cable to the inside of the building. However, no special configuration will be required for the set-up of the indoor repeater, and the residential customer could likely orient the indoor antenna to a particular liking without assistance. It should also be noted that the personal repeater may contain one or more LEDs to indicate RSSI levels, synchronization, or the like, in order to help with the placement of the repeater 210, the orientation and placement of the directional antennas 220 and 230, and to indicate when the repeater 210 has properly synchronized to the timing of the TDD uplink and downlink subframes.

In accordance with other exemplary embodiments, non-frequency translating repeater service is aimed at providing high capacity Internet service in service areas previously difficult to access such as subway service or in-building service. For example, an in-building repeater could be configured as a small indoor unit with one antenna for outdoor or near outdoor placement, and another antenna for indoor placement, for example, as described hereinabove. Other repeater models will be more suitable for self installation.

It is envisioned the exemplary repeaters will have specifications similar to existing repeaters, such as for IS-2000 systems. The repeaters can take various forms including for example, a same frequency indoor repeater, an outdoor infrastructure repeater, which is a high power repeater used to fill in poor or problem coverage areas in a outdoor installation such as in an alleyways or to selectively extend coverage beyond the current coverage areas. The outdoor infrastructure repeater can be deployed on top of buildings, on cell towers, or the like. Further an exemplary repeater can include an indoor distribution system where significant distances must be spanned between the repeater and the antenna coupled to the base station for use in subways and parking garages. Still further, an exemplary repeater can include a fiber optic repeater system with relatively short fiber distances to achieve "deep" in-building coverage. It is believed that long fiber optic distances will cause system level problems with the operation of the repeater systems described herein.

Figure 3:
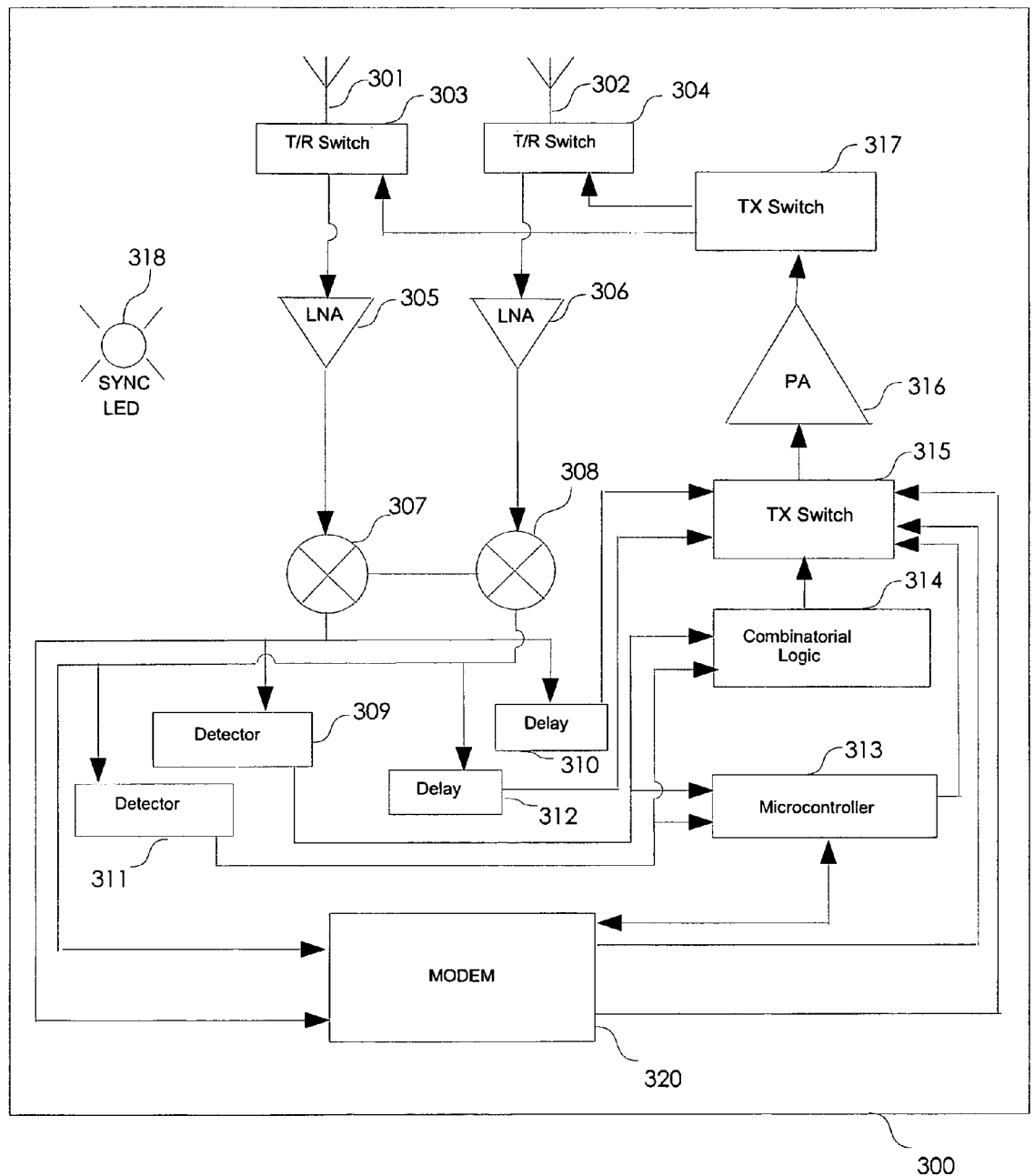
FIG. 3 is a schematic drawing illustrating an exemplary detection and repeater circuit associated with an exemplary non-frequency translating repeater.

A block diagram of an exemplary repeater 300 is shown in FIG. 3. An antenna 301 and an antenna 302 are coupled to a Transmit/Receive (T/R) switch 303 and 304 respectively. Initially, each of the T/R switch 303 and the T/R switch 304 is set to feed the signal from each of the antenna 301 and the antenna 302 into the corresponding low noise amplifier (LNA) 305 and the LNA 306. The amplified signal is then translated down in frequency using a frequency mixer 307 and a frequency mixer 308 and can further be passed into a corresponding signal detector such as a detector 309 for antenna 201 and a detector 311 for antenna 302. The first antenna for which a signal is detected is set as the input antenna by configuration of one of the T/R switch 303 or the T/R switch 304, and the other antenna is set as the output antenna again, by configuration of the other of the T/R switch 303 or the T/R switch 304. It should be noted that in a typical application such as in a 802.16 application, the detection process takes about 500 ns, and the delay in setting up the transmit switch is about 200 ns. A transmit switch 315 passes the signal from the input antenna, delayed by a delay amount added in one of a delay element 310 or a delay element 312, into a power amplifier 316 which feeds the amplified signal, through the operation of another transmit switch 317, into one of the antenna 301 or the antenna 302 designated as noted above as the output antenna. It will be appreciated that the amount of delay should not exceed or even be close to the timeout value associated with the protocol. Further, if the TDD protocol requires synchronization, the detection delays may not need to be compensated for. A microcontroller 313 and a combinatorial logic circuit 314 can be used to increase the reliability of the detection process and to perform additional procedures such as system maintenance, control, and the like as will be appreciated by one of ordinary skill in the art, and to execute certain software to enhance, augment, or control operation of the repeater 300. It will also be appreciated that in some embodiments, at least one of the connections between the antenna 301 and 302 can be coupled to the exemplary repeater module using fiber optic cables. Also in some embodiments, a modem 320, such as an 802.16 modem or the like, can be used to demodulate, for example, signaling information associated with control channel information so as to be able to gather channel assignment information associated with the network. The modem 320 can also be used to transmit modulated data.

It should further be noted that the detector 311 may be used in itself to enable repeating or may be used in combination with the synchronized uplink or downlink frame timing. Alternatively, the detector 311 may be only used to maintain uplink and downlink synchronization. For instance, once synchronized, the detector 311 on a given antenna will cause repeating from that antenna to the other antenna. However, if the detector 311 detects a signal in a timeslot not defined as a valid repeater slot for the given antenna, it would not repeat the information.

NMS as mentioned hereinabove, for the repeater 300 can be implemented in certain cases such as in connection with the in-building distribution repeater and the infrastructure repeater. However, due to the additional cost of the modem, microprocessor, and memory, it is not expected that there will be a NMS option for the typical, personal use type repeater. NMS can include remote gain adjustment, remote firmware upgrades, internet firewall, VPN, parental control, and spam filtering and can be developed with coordination from the customer premise equipment (CPE) vendor.

Figure 4:
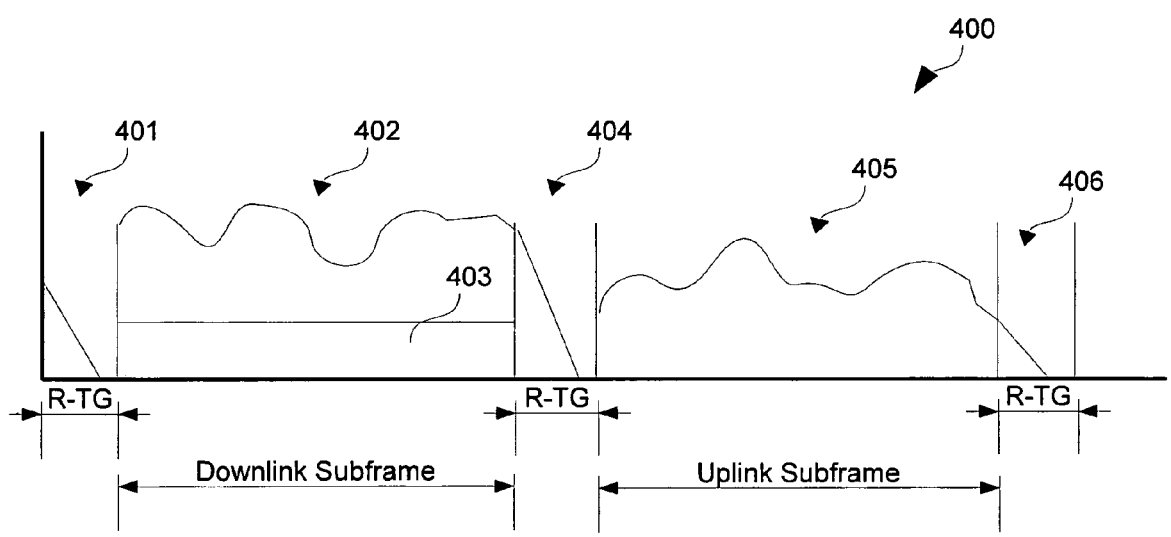
FIG. 4 is a graph illustrating Received Signal Strength Indicator (RSSI) vs. time for exemplary detection associated with various embodiments of an exemplary non-frequency translating repeater.

The received signal strength intensity (RSSI) vs. time on the directional antenna 220 is shown in graph 400 in FIG. 4. It should be noted that the duration of the T/R-TG 401, 404, and 406 and the multipath power from the previous subframe are not shown to scale for purposes of illustration. The information gained from the three steps can be used to modify the detection thresholds in the up/down transmission selection process of the repeater 210 amounting to an a priori detection algorithm where the uplink and downlink detection thresholds are dynamically modified based on the known synchronization of the up and down link slots.

During the T/R-TG 401, 404, and 406, which are typically specified to be at least 5 µs in duration, there is no air activity on either the uplink or the downlink. A windowing function associated with the RSSI can be used to identify the location of these TR gaps. Windowing using an arithmetic mean could be of this form:

$$\overline{RSSI}(n) = \frac{1}{W} \sum_{t=n-W+1}^{n} RSSI(n) \qquad \text{Equation (1)}$$

where W is the number of samples. The index n denotes the discrete time interval during which the RSSI signal 402 and 405 are sampled and can be set, for example, to a sampling period of ½5th of the duration of the minimum T/R-TG of 5 µs in order to accurately determine the subframe timing. With a 5 µs minimum T/R-TG, the sampling frequency should be at a rate of 5.0 MHz. Alternatively, in order to emphasize more recent samples, a windowing function using an exponential forgetting factor can be used which can be expressed as:

$$\overline{RSSI}(n) = \lambda \overline{RSSI}(n-1) + (1-\lambda) RSSI(n) \qquad \text{Equation (2)}$$

In the form given by Equation 2, the memory factor λ is selected, for example, so that the 63% power time constant $t_c$ for the recursion equation is significantly shorter than the smallest T/R-TG gap, say 1 µs. Using the formula for a finite geometric series, the memory factor λ can be shown to be of the form:

$$\lambda = e^{\frac{-1}{f_s t_c}} \qquad \text{Equation (3)}$$

The beginning of the downlink and the uplink frame is typically marked by a rise in the filtered RSSI values. Thus, one way to detect the start of a subframe is to look for several consecutive increases in the filtered RSSI. That is, if the sign associated with $\overline{RSSI}(n) - \overline{RSSI}(n-1)$ is positive for several consecutive samples, then we know that we are at the beginning of a subframe. It is also known that the total duration of the frame is 5 ms, including the transmission gaps, and this knowledge can be used to validate the total length the two transmission gaps and the downlink and uplink subframes. Similarly, when the sign associated with $\overline{RSSI}(n)-\overline{RSSI}(n-1)$ is negative for several consecutive samples, the end of a subframe is indicated.

Alternatively, the RSSI may be judged as above or below a threshold set using an analog comparator and an adjustable reference voltage set, for example, by the microcontroller 313. The threshold can be adapted based on received RSSI levels and the probability of false alarm in the probability of detection. Statistics associated with detection within a period can be one criteria used for synchronization. For example, if a provisional slot assignment is correct for the presumed protocol environment, the statistics associated with consistent reception of a candidate signal in that slot will confirm or validate the initial assumptions about the protocol environment and the synchronization within that environment.

There are several ways in which the probability of the false detection of the beginning and ending of a subframe can be minimized. For instance we know that at the end of a subframe the $\overline{RSSI}(n)$ power level is significantly higher than the noise floor, and the rate of decrease in $\overline{RSSI}(n)$ is high. Similarly, at the beginning of a subframe the $\overline{RSSI}(n)$ power level is near the noise floor, and the rate of increase in $\overline{RSSI}(n)$ is high. This knowledge of the $\overline{RSSI}(n)$ power level relative to the noise floor and the magnitude of its derivative can be used to minimize false detects.

A further determination must be made as to whether the detected subframe is in the uplink or the downlink direction. For some protocols, such as 802.16, where user channels are grouped together, it is expected that the received signal strength at the base station side antenna, such as directional antenna 220 will be much higher on the downlink subframe as compared to the uplink subframe due, for example, to the strong isolation between the uplink and downlink when directional outdoor antennas are employed. Thus, the subframe with the larger power level becomes the downlink subframe, and the subframe with the lower power level becomes the uplink subframe.

Once the timings of the downlink and the uplink subframe have been determined, the tracking mode of, for example, the detection algorithm is initiated. The start and end times of the frames can be tracked with an algorithm such as a non-coherent RSSI slope detection algorithm. Considering the downlink subframe start time loop for illustration, suppose that the estimate of the start-time of the downlink subframe is s(n). Then from one 5 ms frame to the next, the downlink subframe start timing is adjusted using the formula:

$$s(n+1) = \begin{cases} ws(n) + (1-w)d(n) & |d(n)| > 0 \\ s(n) & |d(n)| = 0 \end{cases} \quad \text{Equation (4)}$$

where d(n) is the direction in which the downlink subframe start timing is adjusted, and w is the memory factor associated with the start time s(n). It should be noted that d(n) is defined by the formula:

$$d(n) = -\text{sign}\left[\sum_{k=-N}^{N-1} f(\overline{RSSI}(n+k), \overline{RSSI}(n+k-1))\right] \quad \text{Equation (5)}$$

where N is the number of samples to either side of the start timing of the frame, and $$f(a, b) = \begin{cases} +1, & b-a > \text{threshold} \\ -1, & \text{else} \end{cases} \quad \text{Equation (6)}$$

The threshold in Equation 6 should be large enough such that only significant increases in $\overline{RSSI}(n)$ associated with the start of a downlink subframe are assigned a positive value. With reference to FIG. 4, the threshold 403 can represent a baseline threshold value.

As noted above, the specification for the repeater calls for 75 dB in isolation between the transmit and the return antennas. In practice the amount of isolation may be even larger because of the directivity of the antennas and the wall between the exterior antenna and the interior antenna. Practical deployments of non-frequency translating repeaters for networks already exist, thus empirical evidence suggests that isolation should not be a significant problem. Other repeater embodiments, such as a window based single unit may only achieve 40 dB or 50 dB of isolation in which case the amplification may be reduced.

However, in the event of some feed back causing an unstable amplification loop, an automatic gain control (AGC) circuit will recognize the feedback condition and can be configured to reduce the amplification of the signal eliminating unwanted oscillation at the expense of some loss in repeater gain. Assuming x[n] as the input signal at discrete time n. The total gain of the signal received by the input antenna as measured at the output antenna is quantified the $g_a$ term. The output signal at discrete time n is y[n]. The feedback packet is composed of the feedback gain $g_f$ and a unit time delay. A difference equation can then be given by the formula:

$$y[n]=g_a x[n]+g_f g_a y[n-1] \quad \text{Equation (7)}$$

In order to achieve stability, it is necessary for the product of the amplifier gain and the feedback gain to be less than one. In order words, the isolation between the transmit and receive antennas quantified by the gain $g_f$ needs to be greater than the gain $g_a$ of the signal through the repeater.

With reference again to FIG. 3, it should be noted that in accordance with exemplary embodiments, if required, the repeater 300 can delay the input radio frequency signal by an amount equal to the time it takes to determine the direction in which signal amplification needs to take place, for example, as described above. All of the transmit and receive switches such as T/R switches 302, 303 and TX switches 315, 317 are set to the correct direction just prior to the arrival of the delayed input signal into the PA 316, and hence no portion of the signal is ever clipped. The direction of amplification will be known based on the defined timeslots and the synchronized framing. Thus, the above described techniques may be used in combination to enable repeating. For example, synchronization AND detection on a specific antenna port must be present to enable repeating. In other words, repeating will be enabled only when a signal is detected on a given antenna port when it should be present, such as during a valid uplink or downlink time slot in accordance with the synchronization.

In addressing issues related to adjacent cell interference, the repeater 300 can diminish the bit rates of some of the subscribers located at the edge of the adjacent cell in a single network system because of the increase in the adjacent cell interference. In contrast with a frequency translating repeater, where interference can never be increased because the subscriber side signal is being repeated into a separate frequency band, the repeater 300 is in a more favorable environment relative to the subscriber terminal for the connection to the base station, so on the uplink the interference generated towards neighboring cells on the frequency allocated for the base stations is actually lower. On the downlink, the signal from the base station generates less interference to the subscriber terminals for the same reason.

With a non-frequency translating repeater additional interference could be generated to the surrounding cell site on the downlink, especially if the repeater gain is high. However, with sufficient antenna down-tilt interference can be mitigated. Further, because the repeater, by definition, is likely to be providing signal amplification in a region where there would be minimal signal strength without the repeater, the total interference signal power is not expected to be much higher at the edge of the surrounding cell or in the interior of a structure. Also, in a practical deployment with a unity reuse factor, neighboring base stations may select different OFDMA sub-carriers to transmit to their respective users at the cell edge, and this would further enhance the bit rates seen at the edge of the cell. For PHS embodiments, little interference is expected as each base station or CS will perform dynamic frequency assignment. In an exemplary embodiment, the repeater will synchronize and track based on the known slot structure and one of the 300 KHz time slot channels such as the control channel on only one carrier frequency. The repeater can then repeat across the 20 MHz frequency band giving rise to narrow band detection and wideband non-frequency translating repeating in both uplink and downlink directions across the entire 20 MHz band based solely on synchronization on the narrow band channel.

On the uplink, the interference level at the target base station should be the same, but it will be lower at the neighboring base stations because of the proximity of the repeater to its associated base station. In connection with an IEEE 802.16 based system, users located at the outer fringe of a cell are assigned to separate sub-carriers meaning that even if the cell size is increased somewhat with the repeater, the interference will be limited by virtue of the sub-carrier planning.

It should be noted that use of an active RF repeater versus a store-and-forward repeater operating at the data link or network layer provides advantages in the areas of delay, bit rates, and complexity. A store-and-forward repeater recovers the signal and retransmits it to extend the range or to improve the system throughput. A simple exponential power path loss model can be used to examine the performance of the repeater system. Suppose that the signal follows an $n^{th}$ order path loss model, and the repeater is situated midway between the subscriber terminal and access point. The ratio of the power received at the repeater relative to the subscriber is given by:

$$\frac{P_r}{P_s} = 10 \log_{10}\left(\frac{P_t r_r^{-n}}{P_t r_s^{-n}}\right)$$

$$= -3n$$

Equation (8)

With a third order path loss, the store-and-forward repeater thus provides 9 dB of gain in the received SNR. Table 1 indicates the required SNR levels and the number of bits per block for different modulation rate and coding schemes associated with the IEEE 802.16 standard. For the three lowermost modulation schemes, the block size improves by a factor of 2 to 3 with the 9 dB improvement in link budget, meaning that in spite of having to transmit the packet twice, there is a net improvement in the throughput although margin and with increased delay. Table 1 indicates the improvement in the block size for different modulation and code rate schemes. The block size improvement ratio, for example, is the increase in the number of bits occupied in the block if 9 dB is added to the link budget. It should also be noted that with a higher order path loss, an even greater improvement in the throughput is expected.

An active RF repeater is advantageous in comparison to a store-and-forward repeater because of improvements in delay, improvements in throughput, and reduction in complexity. Further, the integrity of data security schemes is maintained with an RF based repeater since no encryption keys are required resulting in reduced complexity and management. The delay of an RF repeater is under one microsecond and potentially several hundred nanoseconds, whereas the delay of a store-and-forward repeater is larger than the frame time, which is 5 ms for IEEE 802.16. An increase in delay of this magnitude is not tolerable for many delay sensitive applications. It will be appreciated that a bottleneck in the bit rate of the store-and-forward repeater arises in that the achieved bit rate is limited by the bit rate of the slowest point-to-point link. Since it is not always possible to place the repeater exactly half-way between the subscriber and base station, the improvement in throughput and range may be quite limited. Also, as indicated in Table 1, the improvements in the bit rate are the greatest for the smaller block sizes, and diminish for the larger block sizes. Because each packet needs to be sent twice, in the case of R=¾ 16-QAM and 64 QAM modulation the store-and-forward repeater may reduce the cell throughput. Lastly, a store and forward repeater is inherently more complex because of the additional processing which must take place in order to recover and retransmit the packet adding to the price of the repeater and increasing its power consumption. Practical limitation in the protocols related to security, Quality of Service (QoS), and cost of installation, and network management can prevent the widespread adoption of store and forward repeaters.

As noted below, Table 1 shows receiver SNR and uncoded block size for the IEEE 802.16 Signal Constellations, and block size improvement ratio with 9 dB SNR improvement.

| Modulation | Coding rate | Receiver SNR (dB) | Uncoded block size | Block Size Improvement Ratio |
| --- | --- | --- | --- | --- |
| QPSK | ½ | 9.4 | 24 | 3 |
| QPSK | ¾ | 11.2 | 36 | 2 |
| 16-QAM | ½ | 16.4 | 48 | 2.25 |
| 16-QAM | ¾ | 18.2 | 72 | 1.5 |

-continued

| Modulation | Coding rate | Receiver SNR (dB) | Uncoded block size | Block Size Improvement Ratio |
|---|---|---|---|---|
| 64-QAM | ⅔ | 22.7 | 96 | 1.125 |
| 64-QAM | ¾ | 24.4 | 108 | 0 |

It will be appreciated that an exemplary repeater can provide gain within the confines of the inner and the outer power control loops of the subscriber and base station equipment. For example, as noted above, the exemplary repeater is programmable through the configuration utility to provide a gain between 40 and 80 dB, subject to a 15 dBm peak power limitation associated with the power amplifier. The automatic gain control (AGC) loop is designed to accommodate the fast uplink power control of IEEE 802.16d/e protocol which is vendor specific, but required to adjust to fades up to 30 dBs/second. The purpose of the AGC loop in the repeater is to prevent saturation of the power amplifier caused by either oscillation as noted above, or by excessive power into the input antenna from the source. However, since such situations are unlikely to happen frequently, it is expected that relatively coarse and infrequent adjustments to the AGC level such as periodic 10 dB adjustments should adequately address such issues.

It should be noted that large gain adjustments in the AGC loop are likely to cause disturbance to the system as a downwards adjustment will cause frame erasures and an upward adjustment will cause an increase in interference to neighboring cells. Therefore strategies are necessary to limit the frequency of the adjustments. One way to limit the adjustments is to simply operate at a nominal operating level which is at some level below the PA saturation level. Another strategy is to over-design the heat-sink on the power amplifier so that it can sustain a certain level of heating beyond the nominal peak level for a limited amount of time, and only adjust the AGC gain if the power output exceeds the design limitations for a sustained amount of time.

Maintaining separate AGC states for each of the uplink and the downlink subframes may also be advantageous. One motivation for separate states is to reduce the power consumption associated with the subscriber terminal and reduce the generation of interference by trading off subscriber terminal power amplifier gain with the uplink repeater gain. Because of the higher directivity of the repeater's antennas and potentially better radio propagation conditions at the repeater, it should be possible to achieve the target receiver sensitivity with less interference to surrounding cell sites by increasing the uplink gain of the repeater. Considering a simple exponential power path loss of order n, suppose a certain transmit power level P_0 is required to achieve the target receiver sensitivity P(r), where the base station is located at a distance r meters away from the subscriber terminal 232. Receiver sensitivity can be defined as follows:

$$P(r) = P_o r^{-n} \qquad \text{Equation (9)}$$

In a second case, suppose that there is a repeater at a distance r/2 meters away.

Receiver sensitivity can be defined as:

$$P'(r) = P_1 \left(\frac{r}{2}\right)^{-n} \qquad \text{Equation (10)}$$

If we wish the received power at the input antenna to the repeater to be the same as the power at the input antenna to the base station, then the ratio in transmit power levels becomes:

$$\frac{P_1}{P_o} = 2^{-n} \qquad \text{Equation (11)}$$
$$= -3n \text{ dB}$$

Thus the total power required to reach the repeater at the same receiver sensitivity is −3n dB as much. By breaking up the signal path into two segments, the total transmit power of the subscriber terminal and the repeater station is −3n+3 dB relative to the direct transmission. With a $3^{rd}$ order path loss, a total of −6 dB lower total transmit power level is required. The $3^{rd}$ order path loss combined with the repeater antenna's better isolation from neighboring base stations means that significantly lower out of cell interference is generated with the uplink repeater placed half way between the subscriber and base stations.

It will be appreciated that signal amplification through the repeater does not generally cause signal distortion to the OFDM waveform. Since the exemplary repeater works at the radio frequency level, and the gain applied by the repeater is flat across, for example with regard to IEEE 802.16 the 10 MHz passband, the OFDM subcarrier waveforms should pass through the repeater unmodified. It should be noted that there will be an increase in the RMS delay spread if both the unamplified signal and the amplified signal arrive at the receiver. However, since the delay through the repeater is less than 1000 ns and more likely around several hundred ns, the increase in intersymbol interference at the receiver should be minimal as the delay is well within the 12.8 μs cyclic prefix at the beginning of each OFDM symbol.

Transmit and receive antenna diversity schemes also work with the exemplary repeater. For example, the IEEE 802.16 standard specifies the structure for Space Time Coding (STC), which is similar to the Space Time Transmit Diversity (STTD) that has been standardized for the 3GPP/PP2 standards which are compatible with the exemplary repeater. In addition, all forms of transmit and receive diversity should be compatible with the exemplary repeater since it amplifies all signals received in the pass band equally. Although the effective wireless channel is modified with the repeater, the phase and the gain modification to repeated signals from all antennas are constant. Thus, there should not be an adverse impact to the transmit and receive antenna diversity schemes. Accordingly, Multiple Input Multiple Output (MIMO) systems can be supported using, for example multiple non-frequency translating repeaters. MIMO refers to multiple radio links with multiple antennas at the transmitter and multiple antennas on the receiver side. With multiple antennas, the spatial dimension of the radio environment can be used to improve the performance of the wireless link.

For PHS operation, the use of fixed frequency control channel timeslots throughout the system allows PSs to know the control channel location regardless of the particular cell, greatly facilitating handovers and the like and eliminating the need for the PS to search for a control channel when moving between cells. Traffic channels are dynamically allocated by the CS based on usage and interference levels according to dynamic channel allocation (DCA). It should be noted that DCA enables efficient use of the frequency spectrum by eliminating fixed frequency assignments. Accordingly, actually traffic channel time slots and frequencies may differ for each session or call. The DCA approach is important for PHS and WiMAX since, for example for PHS, support is provided for multiple carriers within the 20 MHz band on both uplink and downlink timeslots.

It should be noted that if multiple simultaneous transmissions take place in different OFDM sub-channels, as permitted by, for example, IEEE 802.16 OFDMA, which permits multiplexing to take place in both the time and frequency domain, the transmissions to individual users can occupy different sub-carriers simultaneously. Since the exemplary repeater will synchronize to the beginning of the uplink and downlink subframes regardless of how many users are transmitting in these subframes, the repeater will be able to amplify the multiple simultaneous transmissions without any problems. The different number of occupied sub-carriers may however cause a fluctuation in the AGC input power, but the gain control algorithm should provide a sufficient accuracy margin.

Figure 5:
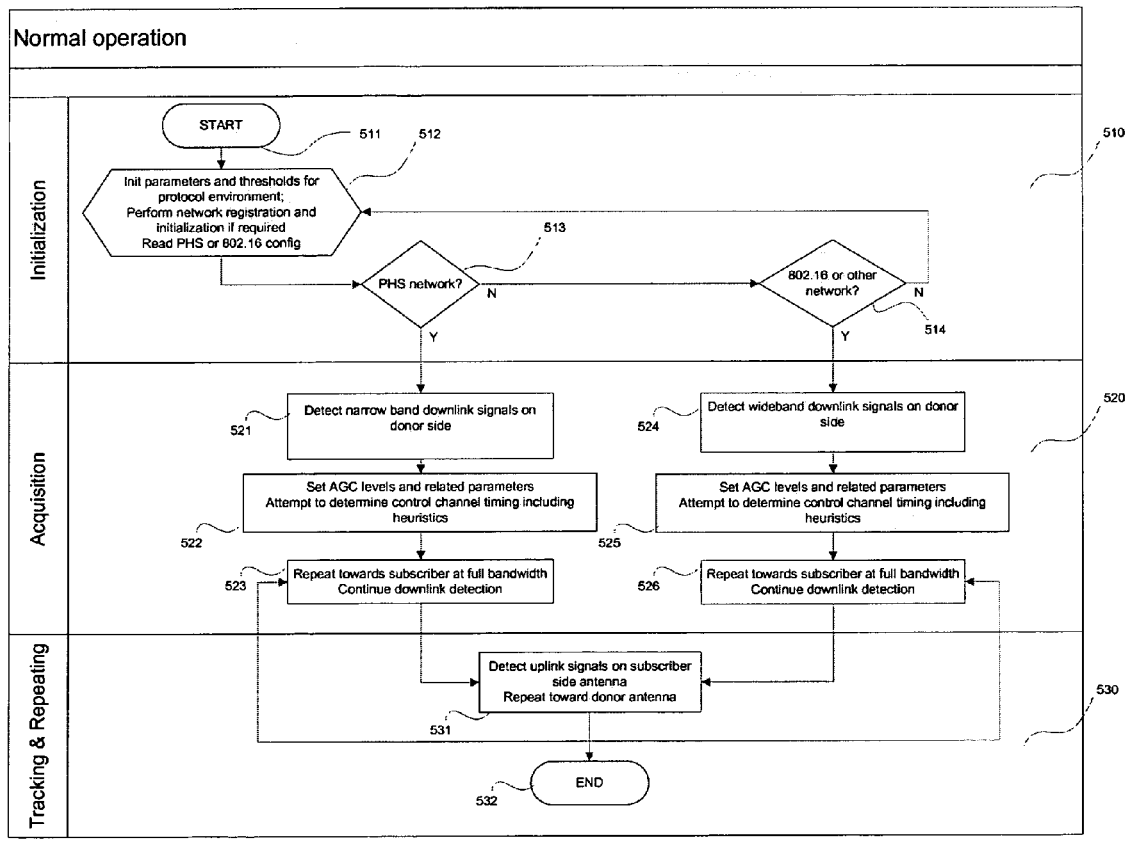
FIG. 5 is a flow diagram illustrating repeater synchronization with TDD intervals associated with various embodiments of an exemplary non-frequency translating repeater.

To better understand the operation of an exemplary TDD repeater in accordance with various exemplary embodiments, a flow chart is present in FIG. 5, showing normal operation. The operation can be broken down into three basic operational states, an initialization state 510, an acquisition state 520, and a tracking & repeating state 530. After start at 511, the repeater can be powered-up and initialized with certain parameters such as gain parameters, detection thresholds or the like for operation in accordance with a protocol environment such as PHS, 802.16, or the like at 512. In the event the repeater is preconfigured for operation in accordance with a specific protocol, the configuration parameters for the preconfigured protocol can be read and set at 512. The repeater can be pre-set for a default operational mode or can be configured to listen to the radio environment and make a determination as to what parameters should be invoked. It should further be noted that in accordance with various exemplary embodiments, repeater hardware will typically be configured for one network environment, such as PHS or 802.16, or the like. Thus, while FIG. 5 shows decision blocks associated with a PHS or an 802.16 based network environment, it will be appreciated that such a multiple network decision structure is for illustrative purposes only. Alternatively, while the repeater hardware will typically be configured to operate in only one environment, the repeater software may be a common software baseline capable of being used in many network environments or may be dedicated to one network environment. Thus, for example, the operating network can be determined, either through pre-configuration, assignment or configuration during initialization, detection, or the like to be a PHS network at 513 or an 802.16 or other network at 514.

If the network environment is a PHS network, the repeater can detect narrow band signals representing downlink signals from the donor antenna at 521 during the acquisition state 520. When a signal is detected, automatic gain control (AGC) parameters and other parameters can be set and an attempt made to determine basic timing at 522, by comparison of observed signal characteristics to known information such as a repetition period of the downlink or other a priori information and/or heuristics, which may indicate the location of the control channel. The downlink signal, once acquired, can be repeated toward the subscriber at, for example, the full 20 MHz bandwidth at 523 and continuing downlink detection and, for example, tracking, can be performed. If the network is an 802.16 or other network, then the downlink or donor side can be detected at full bandwidth at 524. When a signal is detected, automatic gain control (AGC) parameters and other parameters can be set and an attempt made to determine basic timing at 525, by comparison of observed signal characteristics to known information such as a repetition period of the downlink or other a priori information and/or heuristics, which may indicate control channel information. The downlink signal when acquired can be repeated toward the subscriber at the full bandwidth at 526 and downlink detection can continue. Finally, once the acquisition state 520 is completed, uplink signals can be detected on the subscriber side and repeated toward the base station or CS at 531. It will be appreciated that while the exemplary process is indicated as ending at 532, the above described procedures and processes can be part of a larger looping procedure as shown, and thus the above described procedure rather than ending can repeat, or can pass to another procedure or the like as would be understood by one of ordinary skill in the art.

Figure 6:
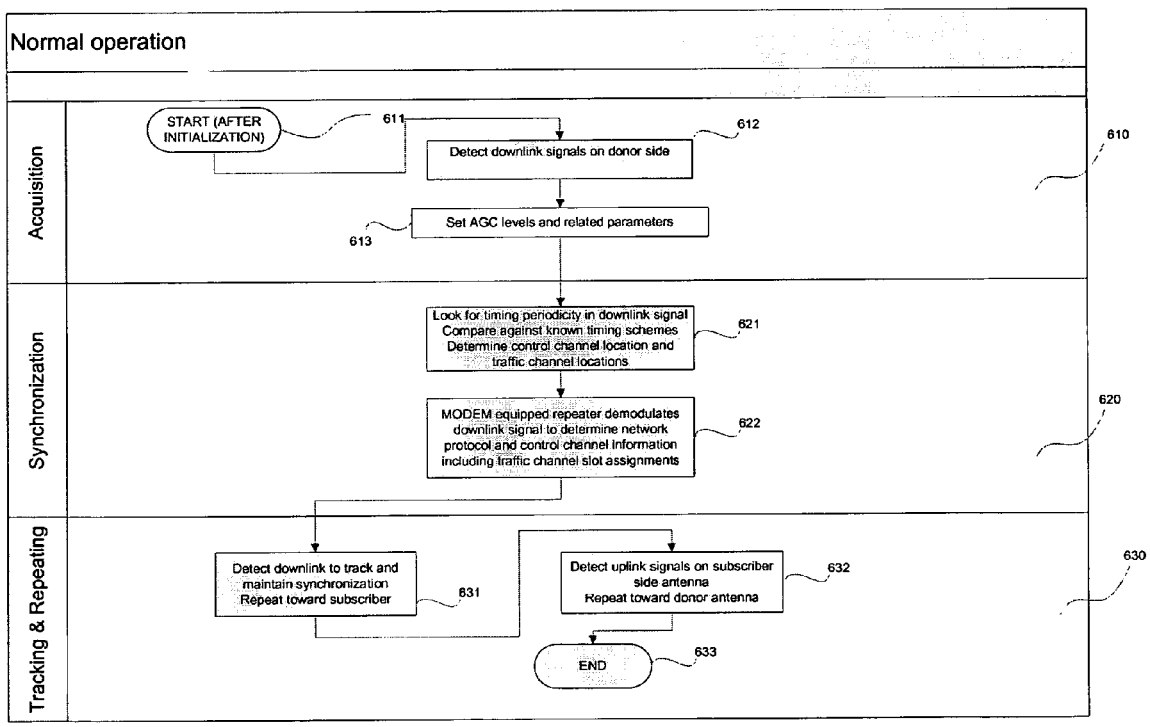
FIG. 6 is a flow diagram illustrating normal operation of a synchronized and scheduled TDD repeater associated with various embodiments of an exemplary non-frequency translating repeater.

A more detailed view of an exemplary procedure in accordance with various embodiments, including synchronization is shown in FIG. 6. It will be appreciated that at start 611, it is assumed that initialization, for example, as described above will have been conducted and an acquisition state 610 has been entered. After start, that is after initialization, the exemplary repeater can detect signals at 612, presumably from a base station or CS and associated with a downlink on the donor side. The repeater can train on the signals for acquisition by setting gain levels or the like associated with AGC values and related parameters. After acquisition, a synchronization state 620 can be entered. In the synchronization state 620 the repeater can look for timing regularity or periodicity in the downlink signals and compare the timing information to known information associated with various protocols in an attempt to identify the type of network the repeater is situated in at 621. It should be noted that as described above, the repeater can use statistical information associated with the RSSI and other parameters in an attempt to locate gaps or intervals which can be correlated with known downlink and uplink characteristics. Other statistical methods can be used to validate assumptions about the network. For example, if the repeater assumes it is within a PHS network, it can establish an assumed location such as a slot or slot pair (uplink and downlink) for the control channel. By accumulating statistics over a given acquisition interval, the repeater can validate within a degree of certainty that the assumed channel is a control channel. It will also be appreciated that in repeaters equipped with a modem such as the modem 320 in FIG. 3, as described above, information such as control channel location, channel timing, traffic channel assignment, power control, and the like information, can be extracted to improve the repeaters ability to effectively and accurately repeat in the desired slots and/or bands at 622.

Once synchronized, the repeater can proceed to a tracking and repeating state 630 where detection can be used for repeating but also for maintaining synchronization and for repeating, such as toward the subscriber at 631. It will be appreciated that, as noted above, repeating is preferably enabled only when detection and synchronization are valid, that is when the detected signal is in the appropriate time slot. With regard to maintaining synchronization, if a timing difference develops between the timing information regarding traffic channel slots and the like, and the timing as determined using detection, adjustments can be made in the timing information maintained by the repeater. After synchronization, uplink signals on the subscriber side can be detected and repeated, for example toward the donor antenna at 632. It should be noted that, if, for example, an uplink signal is detected on a subscriber side antenna but is occurring in the wrong time slot, the signal will not be repeated. The signal must be detected and must have proper synchronization for repeating to occur. While the exemplary procedure is indicated as ending at 633, it will be appreciated that, as noted above with regard to FIG. 5, the exemplary procedure can loop or execution can pass to another procedure or the like.

Figure 7:
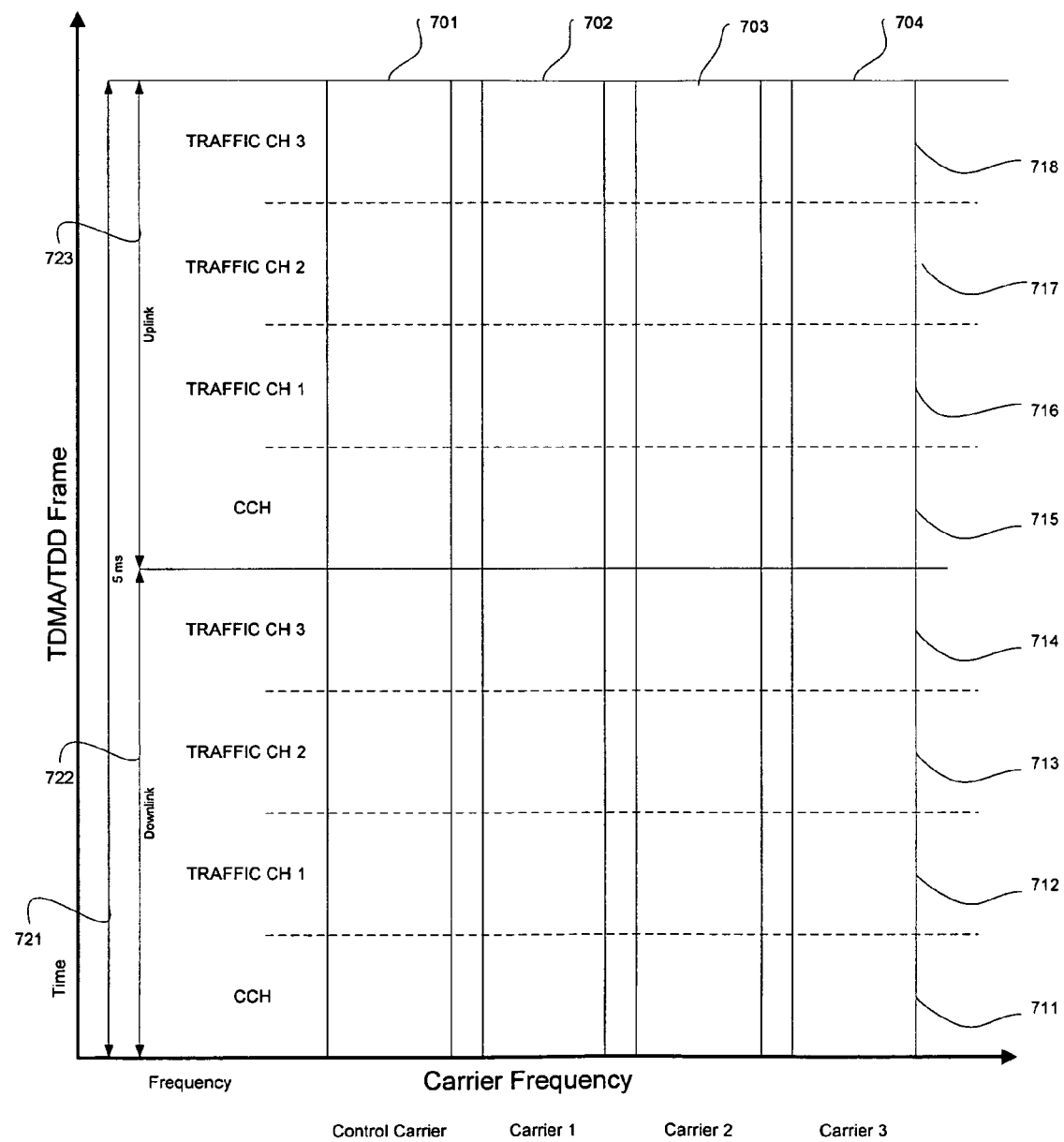
FIG. 7 is a graph illustrating a frequency allocation plan for PHS associated with various embodiments of an exemplary non-frequency translating repeater.
Figure 4:
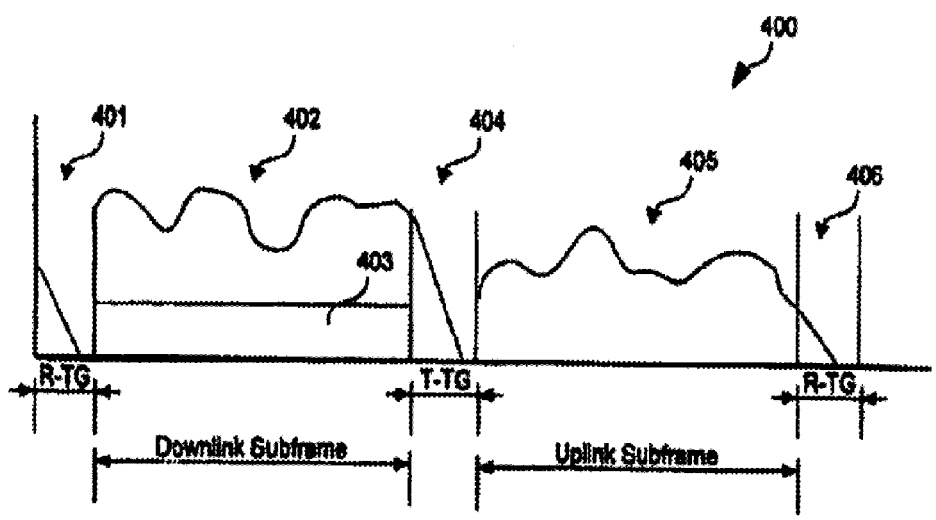

Accordingly, using the above described procedures and circuits, repeating in various protocol environments can be accomplished where non-regenerative, Physical layer (PHY), TDD type repeating is desired. In some protocol environments, such as the PHS environment as described above and as further illustrated in FIG. 7, the channel structure is fixed more greatly facilitating detection and synchronization. In the chart shown in FIG. 7, showing time slot assignment vs. frequency, a typical PHS system has a plurality of frequency carriers: control carrier 701, carrier 1 702, carrier 2 703, and carrier 3 704. Each of the carriers supports four channels channel 1–channel 4 and eight time slots, with each channel having an uplink and a downlink time slot pair with one of the channels being the control channel assigned an carrier, such as control carrier 701, different from the traffic channel carriers, such as carrier 1 702-carrier 3 704. The traffic channels can have the same or different carriers since they are distinguished by time slots. It will be appreciated that the carrier spacing is 300 kHz and the frequency band is in accordance with present standards, at 1895.15–1917.95 MHz serving 77 channels. A typical PS transmits at 10 mW or less and the typical CS transmits at 500 mW or less. With a $\pi/4$ shift QPSK modulation, the transmission rate is around 384 kbps. As can be seen in FIG. 7, a frame time 721 for a PHS transmission frame is generally 5 ms in duration with approximately 2.5 ms reserved for a downlink frame 722 and an uplink frame 723. Each of the downlink frame 722 and the uplink frame 723 contains a control channel and three traffic channels. The downlink frame 722 contains a downlink control channel 711 followed by a downlink traffic channel 1 712, a downlink traffic channel 2 713, and a downlink traffic channel 3 714. On the uplink side, the uplink frame 723 contains an uplink control channel 715 followed by an uplink traffic channel 1 716, an uplink traffic channel 2 717, and an uplink traffic channel 3 718.

One of ordinary skill in the art will recognize that as noted above, various techniques can be used to determine different signal detector configurations and set detection thresholds and the like in the present invention. Additionally, various components, such as detector elements 309 and 311, combinatorial logic element 314, and the functionality of microcontroller 313 and other elements could be combined into a single integrated device. Other changes and alterations to specific components, and the interconnections thereof, can be made by one of ordinary skill in the art without deviating from the scope and spirit of the present invention.

What is claimed is:

1. A method for non-regenerative repeating of a signal transmitted from a first station to a second station according to a Time Division Duplex (TDD) protocol, the first station communicating to the second station on a downlink and the second station communicating to the first station on an uplink, the method comprising:

detecting the presence of the signal in an interval associated with one or more of the uplink and the downlink;

re-transmitting the signal from the second station to the first station using a first antenna directed toward the first station if the signal is detected on the uplink; and re-transmitting the signal from the first station to the second station using one of a second antenna directed toward the second station, and an omni-directional antenna, if the signal is detected on the downlink, wherein a form factor associated with one or more of the first antenna, the second antenna, and the omni-directional antenna facilitates the detecting and the re-transmitting.

2. The method according to claim 1, further comprising adding a delay to the signal before the re-transmitting the signal from the second station to the first station and the re-transmitting the signal from the first station to the second station to compensate for a time associated with the detecting.

3. The method according to claim 2, wherein the delay is less than a timeout parameter associated with the protocol.

4. The method according to claim 1, wherein the detecting includes detecting one or more gaps between an uplink interval and a downlink interval using a windowing function associated with a Received Signal Strength Indicator (RSSI).

5. The method according to claim 4, wherein detecting includes detecting a beginning of one or more of the uplink interval and the downlink interval by detecting an increase associated with the RSSI.

6. The method according to claim 4, wherein the detecting includes identifying the uplink interval as associated with a relatively smaller power level and identifying the downlink interval as associated with a relatively larger power level.

7. The method according to claim 1, further comprising indicating a parameter associated with the uplink and the downlink, the indicating the parameter for facilitating a placement of one or more of the first antenna, the second antenna, and the omni-directional antenna.

8. The method according to claim 7, wherein the parameter includes a synchronization level associated with the uplink and the downlink.

9. The method according to claim 8, further comprising determining the synchronization level based on a parameter correlated to signals from the first station.

10. The method according to claim 1, wherein the protocol includes one of an IEEE 802.16 protocol, an 802.20 protocol, an IEEE 802.16(d) protocol an IEEE 802.16(e) protocol, an IEEE 802.16(d/e) protocol, a Personal Handyphone System (PHS) protocol, and a time division synchronization code division multiple access (TDS-CDMA) protocol.

11. The method according to claim 1, wherein the first station includes a base station and the second station includes a subscriber terminal.

12. The method according to claim 1, further comprising maintaining a first automatic gain control (AGC) level for the uplink and a second AGC level for the downlink separate from the first AGC level.

13. A non regenerative, non-frequency translating repeater for repeating a signal transmitted from a first station to a second station according to a Time Division Duplex (TDD) protocol, the first station communicating to the second station on a downlink associated with an air interface and the second station communicating to the first station on an uplink associated with the air interface, the repeater comprising:

a first antenna coupled to the first station through the air interface;

one of a second antenna and an omni directional antenna coupled to the second station through the air interface; and a repeater module coupled to the first antenna and the one of the second antenna and the omni directional antenna, the repeater module including:

a detector circuit detecting the presence of the signal on one or more of the uplink and the downlink;

a transmission circuit re-transmitting the signal from the second station to the first station using a first antenna directed toward the first station if the signal is detected on the uplink and re-transmitting the signal from the first station to the second station using one of a second antenna directed toward the second station and an omni-directional antenna, if the signal is detected on the downlink, wherein a form factor associated with one or more of the first antenna, the second antenna, and the omni-directional antenna facilitates the repeating the signal, the form factor including a placement.

14. The repeater according to claim 13, wherein one of the first antenna and the one of the second antenna and the omni-directional antenna is defined by the repeater module as coupled to a donor antenna, and wherein the repeater module is configured to synchronize with the signal received from the donor antenna, the donor antenna defined based on one of an installation guideline for the repeater and a known characteristic of the signal associated with the donor antenna.

15. The repeater according to claim 14, wherein the donor antenna is defined based on a signal quality metric including one of: a received signal strength indicator (RSSI), a signal to noise ratio (SNR), and a $E_b/N_0$ value.

16. The repeater according to claim 13, wherein at least one of the first antenna and the one of the second antenna and the omni-directional antenna is coupled to the repeater module using a fiber optic cable.

17. The repeater according to claim 13, further comprising an indicator providing an indication of a parameter associated with the uplink and the downlink, the indication facilitating a placement of one or more of the first antenna, the second antenna, and the omni-directional antenna.

18. The repeater according to claim 17, wherein the parameter includes a synchronization level associated with the uplink and the downlink.

19. The repeater according to claim 13, wherein the repeater module further includes a delay unit for adding a delay between the detection by the detecting circuit and the transmission by the transmitter circuit, the delay compensating for a time associated with detecting by the detector circuit.

20. The repeater according to claim 13, wherein the protocol includes one of an IEEE 802.16 protocol, an IEEE 802.20protocol, an IEEE 802,16(d) protocol, an IEEE 802.16(e) protocol, an IEEE 802.16(d/e) protocol, a Personal Handy-phone System (PHS) protocol, and a time division synchronization code division multiple access (TDS-CDMA) protocol.

21. The repeater according to claim 13, wherein the first station includes a base station and the second station includes a subscriber terminal.

22. The repeater according to claim 13, wherein the detector circuit includes a processor configured to detect one or more gaps between an uplink interval and a downlink interval using a windowing function associated with a Received Signal Strength Indicator (RSSI) associated with the protocol.

23. The repeater according to claim 22, wherein the processor is further configured to detect a beginning of one or more of the uplink interval and the downlink interval by detecting an increase associated with the RSSI.

24. A Time Division Duplex (TDD) repeater system for non-regenerative repeating of a transmitted signal, the system comprising:

a first station;

a second station coupled to the first station through an air interface according to a protocol associated with a network, the first station communicating to the second station on a downlink associated with the air interface and the second station communicating to the first station on an uplink associated with the air interface;

a first antenna coupled to the first station through the air interface;

one of a second antenna and an omni directional antenna coupled to the second station through the air interface; and a repeater module coupled to the first antenna and the one of the second antenna and the omni directional antenna, the repeater module including:

a detector detecting the presence of the signal on one or more of the uplink and the downlink;

a transmitter re-transmitting the signal from the second station to the first station using a first antenna directed toward the first station if the signal is detected on the up link and re-transmitting the signal from the first station to the second station using one of a second antenna directed toward the second station and an omni directional antenna, if the signal is detected on the downlink, wherein a form factor associated with one or more of the first antenna, the second antenna, and the omni-directional antenna facilitates the non regenerative repeating of the transmitted signal.

25. The TDD repeater system according to claim 24, wherein:

the network is a Personal Handy Phone (PHS) network having a plurality of carrier frequencies; and the repeater module is configured to synchronize and track one of the plurality of carrier frequencies, and repeat on all of the other of the plurality of carrier frequencies.

26. The TDD repeater system according to claim 25, wherein the first station includes a base station and the second station includes a subscriber terminal.

27. The TDD repeater system according to claim 25, wherein the processor is further configured to detect a beginning of one or more of the uplink interval and the downlink interval by detecting an increase associated with the RSSI.

28. The TDD repeater system according to claim 24, wherein the form factor includes a placement location for the one or more of the first antenna, the second antenna, and the omni-directional antenna.

29. The TDD repeater system according to claim 24, further comprising an indicator coupled to the repeater module, the indicator providing an indication of a parameter associated with the uplink and the downlink, the indication facilitating a placement of one or more of the first antenna, the second antenna, and the omni-directional antenna.

30. The TDD repeater system according to claim 29, wherein the parameter includes a synchronization level associated with the uplink and the downlink.

31. The TDD repeater system according to claim 24, wherein the repeater module further includes a delay unit for adding a delay between the detection by the detecting circuit and the transmission by the transmitter circuit, the delay compensating for a time associated with detecting by the detector circuit.

32. The TDD repeater system according to claim 24, further comprising an automatic gain control (AGC) module coupled to the transmitter, the AGC module for controlling a transmission level associated with the signal on the uplink and the downlink wherein the transmission level is held at a first predetermined level for the uplink and a second predetermined level for the downlink, based on a condition associated with the network.

33. The TDD repeater system according to claim 32, the AGC module for controlling a transmission level associated with the signal on the uplink and the downlink wherein the transmission level is held at a predetermined level based on a condition associated with the network.

34. The TDD repeater system according to claim 24, further comprising an automatic gain control (AGC) module coupled to the transmitter, the AGC module for controlling a transmission level associated with the signal on the uplink and the downlink wherein the transmission level is held at a first plurality of predetermined levels for a corresponding plurality of channels on the uplink and a second plurality of predetermined levels for a corresponding plurality of channels on the downlink, based on a condition associated with the network.

35. The TDD repeater system according to claim 24, wherein the protocol includes one of an IEEE 802.16 protocol, an802.20 protocol, an IEEE 802.16(d) protocol, an IEEE 802.16 protocol, an IEEE 802.16(d/e) protocol, a Personal Handy-phone System (PHS) protocol, and a time division synchronization code division multiple access (TDS-CDMA) protocol.

36. The TDD repeater system according to claim 24, wherein the protocol includes one of an IEEE 802.16 protocol, an 802.20 protocol, an IEEE 802.16(d) protocol, an IEEE 802.16(e) protocol, an IEEE 802.16(d/e) protocol, a Personal Handy-phone System (PHS) protocol, and a time division synchronization code division multiple access (TDS-CDMA) protocol.

37. The TDD repeater system according to claim 24, wherein the first station includes a base station and the second station includes a subscriber terminal.

38. The TDD repeater system according to claim 24, wherein the detector includes a processor configured to detect one or more gaps between an uplink interval and a downlink interval using a windowing function associated with a Received Signal Strength Indicator (RSSI).

39. A Time Division Duplex (TDD) repeater system for repeating of a transmitted signal, the system comprising:
a first multiple input multiple output (MIMO) station including multiple MIMO transmitters;
a second MIMO station coupled to the first MIMO station through an air interface according to a protocol associated with a network, the first MIMO station communicating to the second MIMO station on a downlink associated with the air interface by transmitting multiple and varying information streams from the multiple MIMO transmitters;
a first plurality of antennae coupled to the first MIMO station through the air interface;
a second plurality of antennae coupled to the second MIMO station through the air interface; and
a plurality of repeater modules respectively coupled to the first plurality of antennae and the second plurality of antennae and for respectively receiving and repeating the multiple varying information streams from the multiple MIMO transmitters.

40. A repeater for repeating a signal transmitted from a first station according to a Time Division Duplex (TDD) protocol associated with a network, the first station communicating on a downlink associated with an air interface, the repeater comprising:
a first antenna for mounting in a window of a building, the first antenna coupled to the first station through the air interface;
a second antenna coupled to the air interface, the second antenna located on an interior of the building; and
a repeater coupled to the first antenna and the second antenna, the repeater module including:
a detector circuit detecting the presence of the signal on the downlink using the first antenna;
a transmission circuit re-transmitting the signal from the first station to the interior of the building using the second antenna,
wherein the detector is further configured to:
synchronize the repeater module with a slot timing of one of the downlink and an uplink associated with the network; and
selectively enable or disable repeating based on the detecting the presence of the signal and the synchronization.

41. The repeater according to claim 40, wherein the network is one of a Wide Area Network (WAN), Wireless Local Area Network (WLAN), and a Wireless Metropolitan Area Network (WMAN).

42. A non-frequency translating repeater for repeating a signal transmitted from a first station to a second station according to a Time Division Duplex (TDD) protocol, the first station communicating to the second station on a downlink associated with an air interface and the second station communicating to the first station on an uplink associated with the air interface, the repeater comprising:
a first antenna coupled to the first station through the air interface;
a second antenna coupled to the second station through the air interface; and
a repeater module coupled to the first antenna and the second antenna the repeater module including:
a detector circuit for detecting the presence of the signal on one or more of the uplink and the downlink in a synchronous time interval;
a transmission circuit for re-transmitting the signal from the second station to the first station using a first antenna directed toward the first station if the signal is detected on the uplink and re-transmitting the signal from the first station to the second station using a second antenna directed toward the second station if the signal is detected on the downlink.

43. The repeater according to claim 42, wherein the detector circuit is configured to detect a beginning of one or more of an uplink interval and a downlink interval.

44. The repeater according to claim 42, wherein the detector circuit is configured to detect an attribute associated with an uplink interval and a downlink interval.

45. The repeater according to claim 44, wherein the attribute associated with the uplink interval and the downlink interval comprises one or more gaps between the uplink interval and the downlink interval.

46. The repeater according to claim 44, wherein the detector circuit is configured to detect the attribute associated with an uplink interval and a downlink interval by detecting an increase in an output of one of a correlating detector and a power detector.

47. The repeater according to claim 42, wherein the detector circuit is configured to detect an uplink interval and a downlink interval timing by detecting a distinguishing signal feature associated with one of the uplink and the downlink.

48. The repeater according to claim 42, wherein the detector circuit is configured to detect an increase in an output of a correlated signal from the first station.

49. A method for repeating of a signal transmitted from a first station to a second station according to a Time Division Duplex (TDD) protocol, the first station communicating to the second station on a downlink and the second station communicating to the first station on an uplink, the method comprising:
    detecting the presence of the signal in an interval associated with one or more of the uplink and the downlink;
    re-transmitting the signal from the second station to the first station using a first antenna directed toward the first station if the signal is detected on the up link; and
    re-transmitting the signal from the first station to the second station using a second antenna directed toward the second station if the signal is detected on the downlink.

50. The method according to claim 49, wherein the detecting includes detecting one or more gaps between an uplink interval and a downlink interval.

51. The method according to claim 49, wherein detecting includes detecting a beginning of one or more of the uplink interval and the downlink interval.

52. The method according to claim 49, wherein the detecting includes detecting an increase in an output of a correlating detector due to the signal being transmitted from the first station.

53. A Time Division Duplex (TDD) repeater system for repeating of a transmitted signal, the system comprising:
    a first multiple input multiple output (MIMO) station including multiple MIMO transmitters;
    a second MIMO station including coupled to the first MIMO station through an air interface according to a protocol associated with a network, the first MIMO station communicating to the second MIMO station on a downlink associated with the air interface by transmitting multiple first information streams from the multiple MIMO transmitters;
    a first plurality of antennae coupled to the first MIMO station through the air interface;
    a second plurality of antennae coupled to the second MIMO station through the air interface; and
    a plurality of repeater modules respectively coupled to the first plurality of antennae and the second plurality of antennae, wherein the first plurality of antennae and the second plurality of antennae are respectively separated by one of polarization and physical distance so that a combination of information streams transmitted from the multiple MIMO transmitters of the first MIMO station and received at the plurality of repeater modules varies in relative proportions.

54. A Time Division Duplex (TDD) repeater system for identifying the presence of a transmitted signal and for maintaining synchronization to an uplink and a downlink timing interval associated with the signal, the system comprising:
    a first station;
    a second station coupled to the first station through an air interface according to a network protocol, the first station communicating to the second station on a downlink associated with the air interface and the second station communicating to the first station on an uplink associated with the air interface;
    a first antenna coupled to the first station through the air interface;
    a second antenna coupled to the second station through the air interface; and
    a repeater module coupled to the first antenna and the second antenna, the repeater module including a transmitter for re-transmitting the signal from the second station to the first station using the first antenna and for re-transmitting the signal from the first station to the second station using the second antenna,
    wherein a form factor associated with one or more of the first antenna and the second antenna facilitates the repeating of the transmitted signal.

* * * * *

UNITED STATES PATENT AND TRADEMARK OFFICE
CERTIFICATE OF CORRECTION

| | |
|---|---|
| PATENT NO. | : 7,233,771 B2 |
| APPLICATION NO. | : 11/127320 |
| DATED | : June 19, 2007 |
| INVENTOR(S) | : James A. Proctor, Jr., Kenneth M. Gainey and Faisal M. Shad |

It is certified that error appears in the above-identified patent and that said Letters Patent is hereby corrected as shown below:

Title page

Should read
Item (75), as Inventors:   James A. Proctor, Jr.., Melbourne Beach, FL (US);
Kenneth M. Gainey, Satellite Beach, FL (US);
Faisal M. Shad, Oakville, Ontario (CA)

Drawings

Sheet 4, Fig. 4, the gap between the down link frame and up link frame, reference numeral 404, should be labeled T-TG.

Signed and Sealed this

Twenty-fifth Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,233,771 B2 | |
| APPLICATION NO. | : 11/127320 | |
| DATED | : June 19, 2007 | |
| INVENTOR(S) | : James A. Proctor, Jr., Kenneth M. Gainey and Faisal M. Shad | |

It is certified that error appears in the above-identified patent and that said Letters Patent is hereby corrected as shown below:

Title page

Correct Item (75), as Inventors should read:
        James A. Proctor, Jr.., Melbourne Beach, FL (US);
        Kenneth M. Gainey, Satellite Beach, FL (US);
        Faisal M. Shad, Oakville Ontario (CA)

Drawings

Sheet 4, Fig. 4, the gap between the down link frame and up link frame, reference numeral 404, should be labeled T-TG.
Delete Fig. 4 and replace with Fig. 4 attached.

Signed and Sealed this

Eighth Day of April, 2008

JON W. DUDAS
*Director of the United States Patent and Trademark Office*